C. SINTZ.
VARIABLE SPEED TRANSMISSION MECHANISM.
APPLICATION FILED FEB. 4, 1910.

986,092.

Patented Mar. 7, 1911.

3 SHEETS—SHEET 2.

Witnesses
H. O. Van Antwerp
Minnie Johnson

Inventor
CLARK SINTZ
BY Luther V. Moulton
Attorney

C. SINTZ.
VARIABLE SPEED TRANSMISSION MECHANISM.
APPLICATION FILED FEB. 4, 1910.

986,092.

Patented Mar. 7, 1911.

3 SHEETS—SHEET 3.

Witnesses
H. O. Van Antwerp
Minnie Johnson.

Inventor
CLARK SINTZ
By Luther V. Moulton
Attorney

UNITED STATES PATENT OFFICE.

CLARK SINTZ, OF NEW ORLEANS, LOUISIANA, ASSIGNOR OF FIFTY-ONE ONE-HUNDREDTHS TO WILLIAM A. GORDON, OF NEW ORLEANS, LOUISIANA.

VARIABLE-SPEED TRANSMISSION MECHANISM.

986,092.     Specification of Letters Patent.     Patented Mar. 7, 1911.

Application filed February 4, 1910. Serial No. 542,105.

*To all whom it may concern:*

Be it known that I, CLARK SINTZ, a citizen of the United States of America, residing at New Orleans, in the parish of Orleans and State of Louisiana, have invented certain new and useful Improvements in Variable-Speed Transmission Mechanism; and I do hereby declare the following to be a full, clear, and exact description of the invention, such as will enable others skilled in the art to which it appertains to make and use the same.

Figure 1:
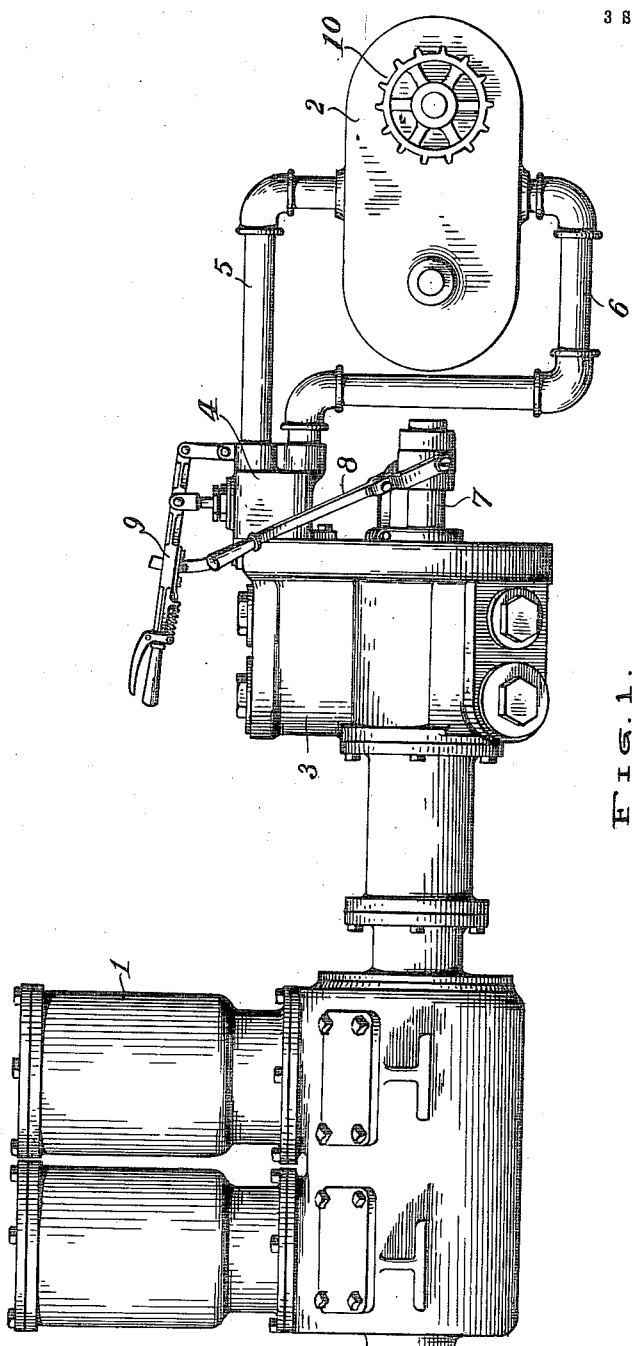
Figure 2:
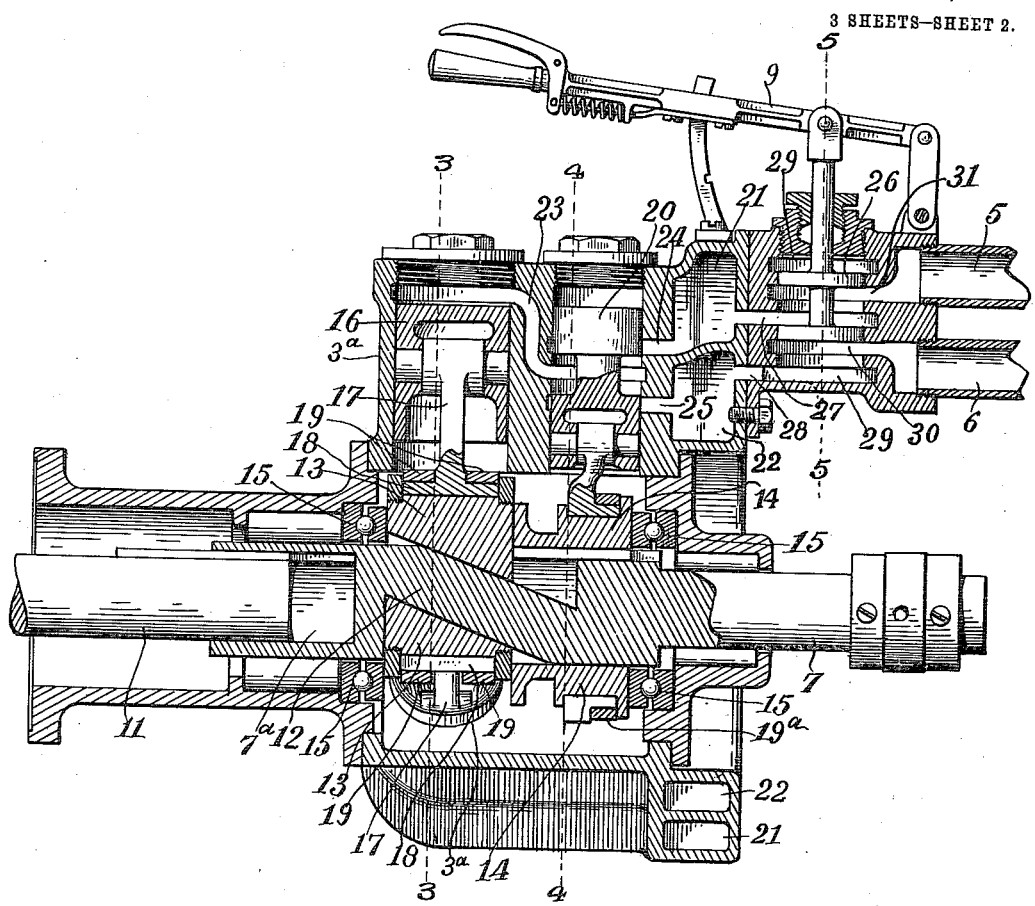
Figures 5, 6:
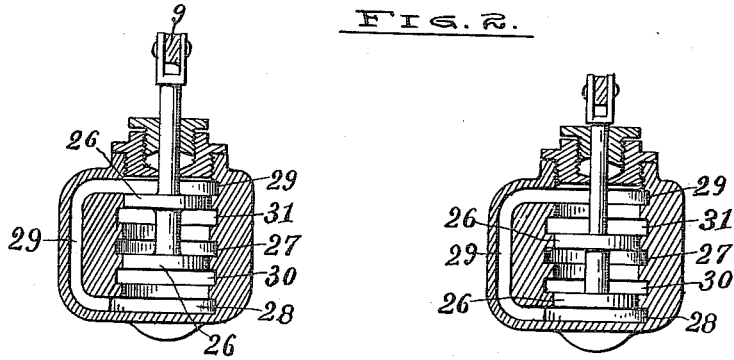
Figure 3:
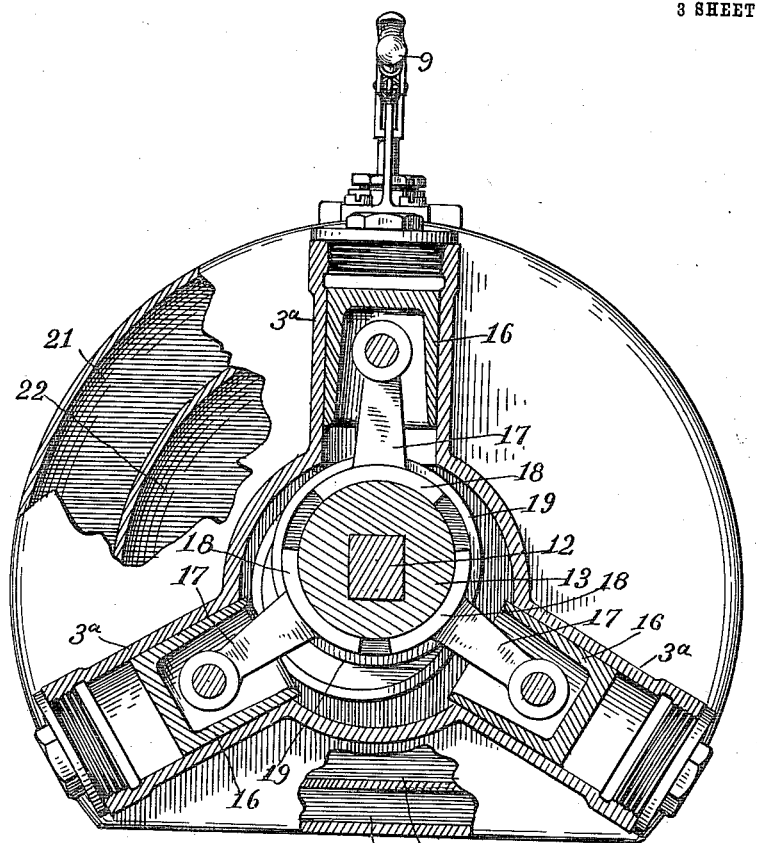
Figure 4:
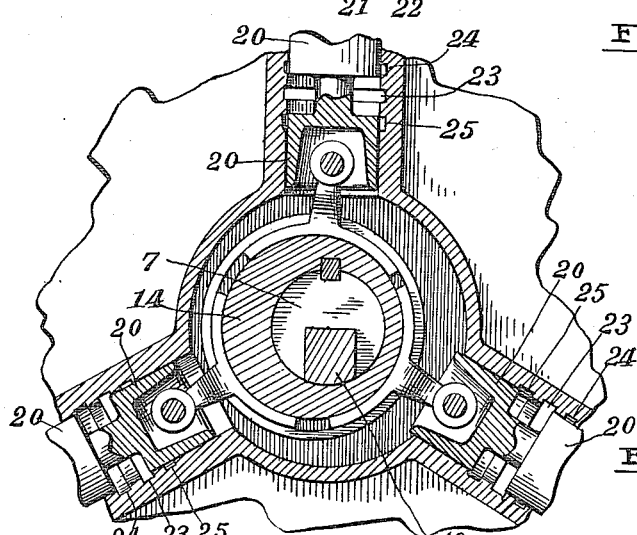

My invention relates to improvements in variable speed transmission mechanism, and more particularly to fluid operated devices of this class, and its object is to provide the same with various new and useful features, as hereinafter more fully described and particularly pointed out in the claims, reference being had to the accompanying drawings, in which:

Figure 1 is a side elevation of a device embodying my invention; Fig. 2 an enlarged detail in vertical section of the variable speed transmitting mechanism; Fig. 3 a transverse vertical section on the line 3—3 of Fig. 2; Fig. 4 a sectional detail on the line 4—4 of Fig. 2; Fig. 5 a vertical section on the line 5—5 of Fig. 2; Fig. 6 the same with the reversing valve shifted.

Like numbers refer to like parts in all of the figures.

1 represents any convenient prime motor adapted to run at constant speed, preferably an internal combustion engine.

2 is a fluid actuated motor for driving the driven mechanism at variable speeds, the form shown being an ordinary rotary fluid actuated motor.

3 is the fluid propelling mechanism adapted to propel various quantities of fluid in a given time as hereinafter described.

4 is the reversing valve; 5 and 6 the respective pipes connecting the fluid propeller with the variable speed secondary motor; 7 a longitudinally adjustable member whereby the speed of the driven motor is varied; 8 a lever for shifting the same longitudinally to change the throw of the pistons.

9 is a lever to operate the reversing valves; 10 any convenient wheel for connecting the secondary or variable speed motor to whatever mechanism is to be driven at variable speeds, as occasion may require.

11 is the driving shaft of the prime motor, which is driven at constant speed. This shaft is slidable in a socket 7ª in the longitudinally movable shaft 7 and is splined therein to positively drive said shaft. An intermediate portion of this shaft as at 12 is made angular in cross section and extends at an incline to the axis of the shaft and across the same. On this angular portion is slidably mounted an eccentric forming a crank member to drive the pistons hereafter described, the eccentricity of this crank member to the axis of the shaft 7 increasing and decreasing as the same slides along the portion 12, being at the maximum when at one end of the same, and reduced to zero, or nearly so, when at the other end. The shaft 7 is slidable longitudinally in this eccentric, and mounted thereon and slidably connected thereto, is a second eccentric 14 of constant throw to which is connected the valve 20 by means of a strap and connecting rod, the strap being made in segmental sections and held on the eccentric by a band 19ª surrounding the same. The eccentric 13 operates the pistons 16 and three of these pistons are preferably used reciprocating in cylinders 3ª radially and equidistantly arranged about the axis of the shaft 7. These pistons are operated by rods 17 terminating in segments 18 held in contact with the eccentric 13 by rings 19 surrounding the same between which rings and the eccentric the segments oscillate when the device is in operation. Thrust bearings 15 are inserted in the respective sides of the case and engage the eccentrics 13 and 14.

A valve 20 is provided for each cylinder, which valve is of the usual spool form having two equal ends to fit the bore of the valve case and having a middle chamber therebetween. A port 23 extends from the outer end of each cylinder 3ª to opposite the middle chamber of these valves, and as the valve is shifted, this port 23 alternately communicates with ports 24 and 25 located at the respective sides of the port 23. The ports 24 all communicate with an annular chamber 21 in the case, and the ports 25 all communicate with a second annular chamber 22 in the same.

26 is a reversing valve having the spool form, consisting of two heads spaced apart with a chamber therebetween and adjustable in a suitable chamber by means of the lever 9.

A port 27 communicates with the annular chamber 21 and with the space between the ends of the valve, and the port 28 communicates with the chamber 22 at one end and with both ends of the valve chamber by means of a by-pass 29. Between these end ports 28 and the central port 27 is a port 31 communicating with the pipe 5 and a port 30 communicating with the pipe 6.

When the valve 26 is in the upper position as shown in Figs. 2 and 5, the chamber 21 communicates with the pipe 5 through the central port 27 and the intermediate port 31, and the chamber 22 communicates with the pipe 6 through the ports 28 and 30. To reverse the direction of rotation, the valve is moved down by the lever 9 to the position shown in Fig. 6. The chamber 21 now communicates through the ports 27 and 30 with the pipe 6, and the chamber 22 communicates with the pipe 5 through the port 28, the by-pass 29, and the port 31. This reverses the current through the pipes 5 and 6 and reverses the direction of rotation of the secondary motor 2. To vary the speed of this driven motor, the stroke of the pistons 16 is varied by sliding the shaft 7 endwise within the eccentrics 13 and 14. The diagonal portion 12 of this shaft moving transversely through the eccentric 13, increases or decreases the eccentricity of the latter and thus changes the stroke of the piston, being the greatest when in the position shown in Fig. 2, and least or none whatever when the shaft 7 is shifted to the left to the full limit and intermediately reduced at intermediate positions of the shaft. Any convenient means (not shown) may be utilized to hold the lever 8 and thus maintain the adjustment.

In operation, the device is filled with oil, or other inelastic fluid which is propelled with greater or less speed by the pistons 16 through the pipes 5 and 6, and the secondary motor 2 varying the speed of the latter according to the longitudinal adjustment of the shaft 7, the secondary motor being driven by the fluid. To reverse the direction of rotation of this motor, all that is necessary is to shift the valve 26, as occasion requires, which reverses the current of fluid in the pipes 5 and 6 and the driven motor.

In operation, each valve 20 moves oppositely to the respective piston 16. The fluid is thus taken from the chamber 21 into the cylinder 3$^a$ on the in-stroke of the piston and discharged into the chamber 22 at each out-stroke of the piston. This positive valve movement is preferable as giving a certainty of action regardless of the length of stroke or speed of the piston. The fluid thus propelled by the piston 16, flows to and from the driven or secondary motor in greater or less quantity, and thus determines the speed of the same, and the position of the reverse valve 26 determines the direction of the flow whether forward or backward. Thus any speed in either direction can be secured by merely shifting the levers 8 and 9 at the pleasure of the operator.

This device is especially adapted for transmission in automobiles or boats, being adjusted for any preferable speed either forward or backward and readily reversed without any unpleasant jar or strain upon the mechanism.

What I claim is:—

1. A variable speed transmission device, comprising a primary motor, a shaft driven by said motor and having a portion inclined to its axis, an eccentric slidable on said inclined portion, a pump having a reciprocating piston driven by said eccentric, and means for adjusting the eccentric longitudinally relative to said inclined portion of the shaft.

2. A variable speed transmission device, comprising a primary motor, a shaft driven by said motor and longitudinally movable, and also having a portion inclined to its axis and angular in cross section, an eccentric driven by said inclined portion, a pump piston driven by said eccentric, a secondary motor driven by fluid propelled by the pump piston and means for longitudinally adjusting the shaft to vary the stroke of the piston.

3. A variable speed transmission device, comprising a primary motor adapted to run at constant speed, a secondary fluid operated motor, a longitudinally movable shaft driven by the primary motor and having a portion inclined to its axis, an eccentric driven by said inclined portion and slidable thereon, pistons driven at variable speeds by said eccentric and driving the fluid to operate the secondary motor, and a reversing valve adapted to reverse the flow of the fluid through said secondary motor.

4. A variable speed transmission device, comprising a primary motor adapted to run at uniform speed, a longitudinally adjustable shaft driven by said motor and having a portion inclined to the axis of the shaft, an eccentric driven by said portion and in which the same is slidable, a piston driven by said eccentric, a cylinder in which the piston reciprocates, a valve chamber in communication with the outer end of the cylinder, a valve in said chamber, means for reciprocating the valve, a secondary fluid operated motor, and a reversing valve adapted to reverse the flow of fluid through the motor.

5. A variable speed transmission device, comprising a case having radial cylinders and two concentric receiving chambers and also having a valve chamber between each cylinder and the said chambers, said case also having a port communicating with the outer end of each cylinder and with the middle of the respective valve chambers and also having ports communicating between the valve chambers and the respective annular chambers, reciprocating valves each having a middle chamber in constant communication with the port to the respective cylinder and alternately in communication with the ports to the respective annular chambers, a shaft longitudinally movable in the case, an eccentric in which the shaft is slidable to drive the valve, said shaft also having a portion inclined to its axis, an eccentric driven by the same and in which the same is slidable, and means for connecting the pistons to said eccentric.

In testimony whereof I affix my signature in presence of two witnesses.

CLARK SINTZ.

Witnesses:
JNO. J. WARD,
ANDREW HEW.